J. B. POMROY.
MODE OF WARPING AND UNWARPING CIRCULAR SAWS.
No. 16,339. Patented Jan. 6, 1857.
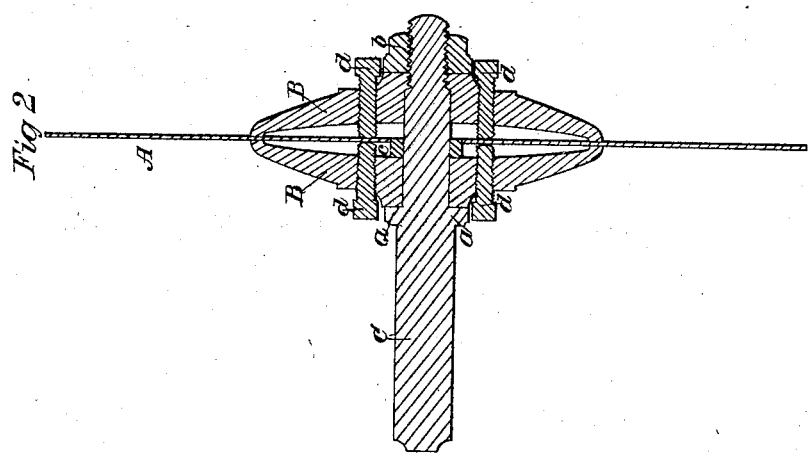
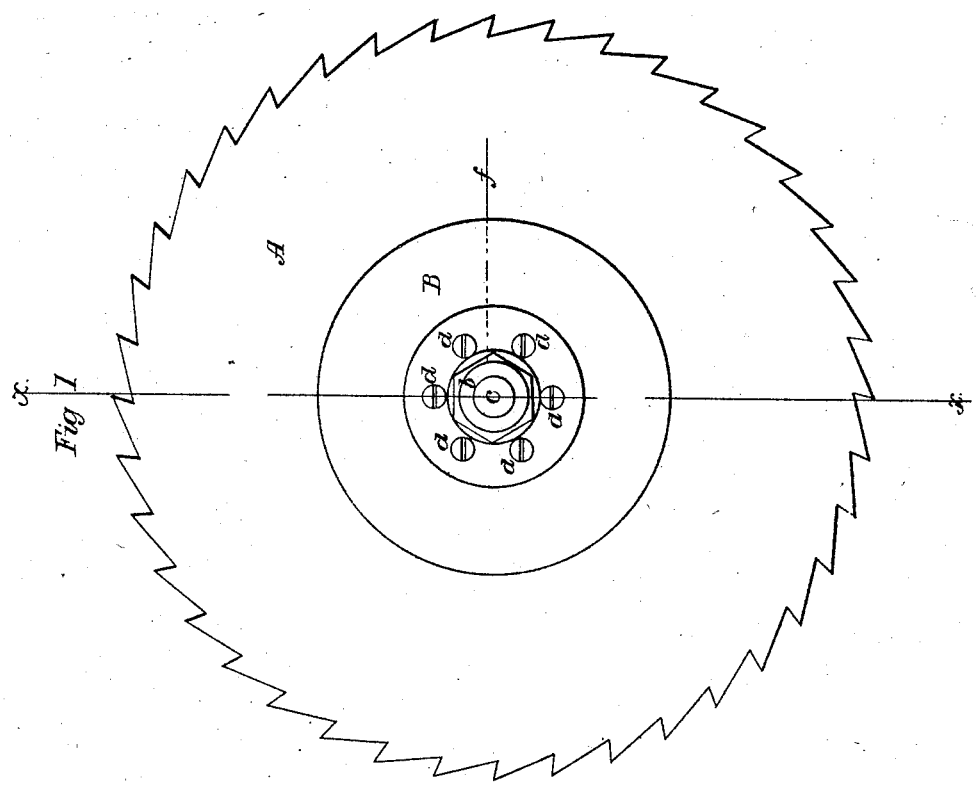

UNITED STATES PATENT OFFICE.

JOSIAH B. POMROY, OF CHICAGO, ILLINOIS.

METHOD OF ADJUSTING CIRCULAR SAWS TO ANY REQUIRED DISH.

Specification of Letters Patent No. 16,339, dated January 6, 1857.

*To all whom it may concern:*

Be it known that I, JOSIAH B. POMROY, of Chicago, in the county of Cook and State of Illinois, have invented a new and improved mode of straightening or taking warps from circular saws and also of warping the same to a dishing form when required to saw in curved lines; and I do hereby declare that the following is a full and exact description thereof, reference being had to the accompanying drawings, making part of this specification, Figure 1 being a side view of a circular saw arranged in my improved manner; and Fig. 2 a section thereof in the line $x$ $x$, Fig. 1.

Like letters designate corresponding parts in both figures.

The saw A, is constructed in the usual manner, except that it has a slit $f$, (Fig. 1,) cut from its central aperture toward the periphery, say one half, or two thirds, the distance to the periphery. The central aperture is made somewhat larger than its arbor C, so as to admit a sliding ring-washer $c$, between the saw plate and arbor, (as seen in Fig. 2,) for the purpose of enabling the plate to be adjusted without hindrance from the friction of the arbor. The saw is secured upon the arbor, by means of two concave cheeks B, B, which touch it only at their peripheries, (as shown in Fig. 2,) thus leaving the saw plate free both within, and without. One cheek bears against a shoulder $a$, on the arbor C, and the other is held on by a nut $b$, which is screwed upon the end of the arbor, and firmly presses both cheeks against the saw.

Through each cheek B, a series of screws $d$, $d$, passes, being arranged in a circle, so as to touch the saw near its inner edge. These screws are firmly set against the saw plate, on both sides, and thereby hold it in place. If any warp is seen in the saw plate, by turning the screws, situated directly toward the center, from said warp, those on one side back, and those on the other side forward, the warp may be at once corrected, and the saw set in a perfect plane. Or if it is desired to saw in curved lines, by screwing back equally all the screws on one side of the plate, and forward all those on the other side of the plate, the saw will be warped into a more or less dishing form, according to the degree to which the screws are adjusted. If the concavity is required to be considerable the slit $f$, (above designated,) is necessary, in order to allow the plate to spring more easily. But for setting the saw a very little dishing, the slit is not required.

Having thus fully described my improved method of straightening, or taking the warps out of circular saws, I would observe that I am aware that triangular-shaped notches have been formed around the inner periphery of a circular saw and then the portions of the plate remaining between said notches have been expanded for the purpose of permanently dishing the saw without dividing its outer periphery; and

Therefore, what I claim as my invention and desire to secure by Letters Patent, is—

Combining the concave cheeks B, B, and set-screws $d$, $d$, with a circular saw which has a slit $f$, (or slits) extending outward a short distance from its inner periphery at the same time that the said saw has an undivided outer periphery, all substantially as represented and described and for accomplishing the purposes herein set forth.

The above specification of my improved method of straightening saws, signed by me this 26th day of September, 1856.

JOSIAH B. POMROY.

Witnesses:
  J. A. HOISINGTON,
  B. HENDRICKS.